United States Patent [19]

Kamiyama et al.

[11] Patent Number: 5,260,784
[45] Date of Patent: Nov. 9, 1993

[54] MULTI-LOOP TESTING APPARATUS WITH FIELD MEMORY

[75] Inventors: Kazuo Kamiyama; Mikio Ishii; Yoichiro Asato, all of Kanagawa, Japan

[73] Assignee: Sony Corporation, Tokyo, Japan

[21] Appl. No.: 865,943

[22] Filed: Apr. 9, 1992

[30] Foreign Application Priority Data

Apr. 11, 1991 [JP] Japan .................................. 3-163294

[51] Int. Cl.[5] ............................................ H04N 17/06
[52] U.S. Cl. ..................... 358/139; 358/335; 358/10
[58] Field of Search .............. 358/139, 10, 160, 323, 358/335; 369/579

[56] References Cited

U.S. PATENT DOCUMENTS 4,682,246  7/1987  Efron et al. ..................... 358/139 X
5,045,950  9/1991  Iwamura et al. ................ 358/323 X Primary Examiner—Victor R. Kostak
Attorney, Agent, or Firm—William S. Frommer; Alvin Sinderbrand

[57] ABSTRACT

Apparatus for adjusting a digital signal which is subjected to analog processing after being reproduced from a record medium. A prerecorded digital test signal is reproduced and written to a field memory which, during a normal playback mode, is used to store the digital video signal that may be reproduced. A loop, which is opened during the normal playback mode, includes DAC and ADC for circulating the digital test signal therethrough a number of times and is coupled to the field memory to receive the stored test signal. A detector detects changes in the test signal after having been circulated through the loop, and these changes are used to establish adjustment settings for adjusting the digital video signal during a playback mode.

20 Claims, 2 Drawing Sheets

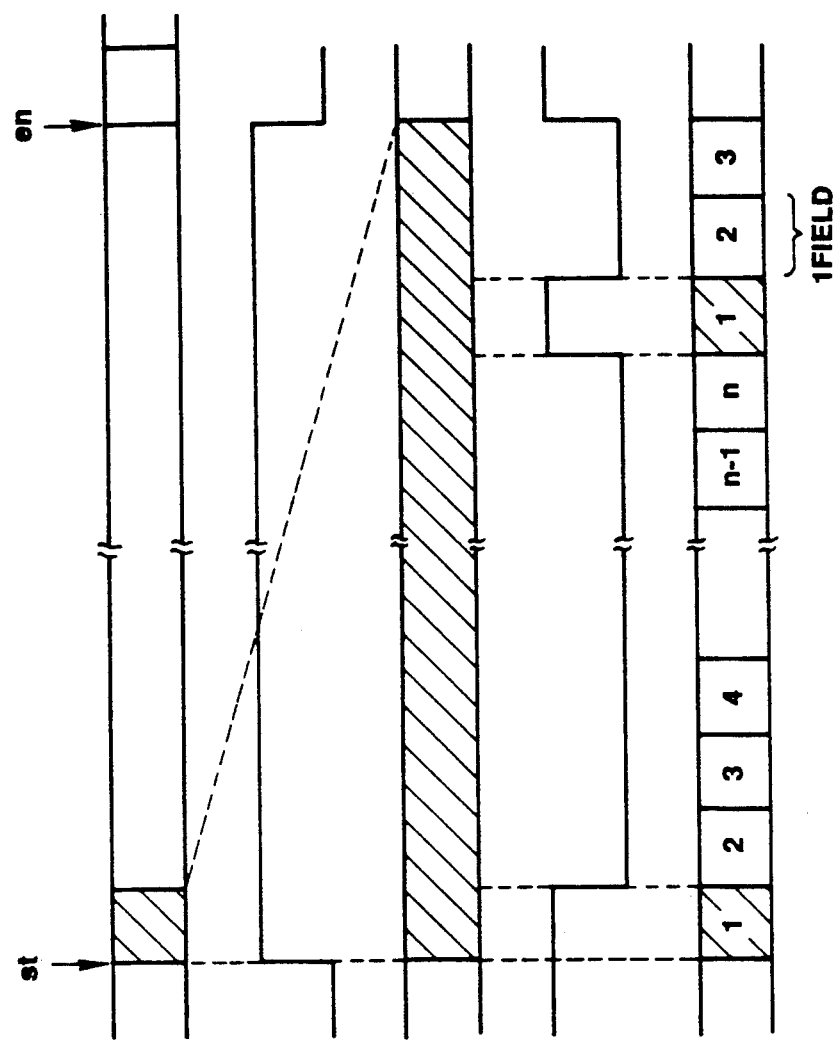

MULTI-LOOP TESTING APPARATUS WITH FIELD MEMORY

BACKGROUND OF THE INVENTION

This invention relates to a technique for reducing degradation and deterioration of video signals which, after being reproduced from a digital record medium are subjected to analog processing and, more particularly, to such a technique which uses a multi-loop test with a field memory for anticipating and correcting such deterioration and degradation.

Digital video recorders are known to provide video signals of high quality which, when subjected to digital processing, suffer little, if any, deterioration. Such digital video signals may be reproduced, recorded and re-recorded several times; and the inherent characteristics of digital signals and digital processing permit repeatability of the reproduction of such digital video signals without loss of quality. However, when digital video signals are subjected to analog processing, such as conversion from digital to analog form, analog recording, analog transmission, and the like, the resultant analog signals may be degraded in comparison to the original digital video signals. If the analog video signal is dubbed and re-dubbed several times, such degradation is multiplied and deterioration of the video signal and video picture ultimately reproduced therefrom becomes quite noticeable. Even if the analog video signal is converted to digital form, as by an analog-to-digital converter, for digital processing and recording, the inherent quantizing noise associated with such A/D conversion adds to the deterioration of the video signal.

Typically, degradation of the video signal appears as errors in the amplitude, frequency, phase or reference signal levels (e.g. the video black signal level) in the analog video signal. Such errors often are not uniform and constant but, rather, vary as a function of the analog processing to which the video signal is subjected, as well as the apparatus and operating characteristics used to process, record, reproduce or transmit the video signals. If apparatus which tends to introduce the aforenoted errors are connected in cascade, the deterioration of the video signal caused thereby is aggravated.

In anticipation of such degradation of the video signals caused by analog recording and reproduction thereof, recording/reproducing apparatus often is adjusted, or pre-set during manufacturing to compensate or pre-correct for expected errors. However, such pre-settings often must be readjusted by the end user of the apparatus, which is a difficult, time-consuming and laborious task. Indeed, manual adjustments to minimize degradation of the video signal that is dubbed or re-dubbed often cannot be determined until several successive dubbing operations have been carried out. Furthermore, even when video signal degradation is recognized sufficiently to permit correction, it has been found that when an error associated with one type of characteristic in the video signal is corrected, errors may appear in other characteristics. Thus, pre-correction adjustments often are dependent upon each other, which require several trial and error adjustment iterations of individual video signal characteristics until the user is satisfied. This difficulty is compounded when it is recognized that the errors for which such pre-correction adjustments are made often are so small that they can be detected only with difficulty. For example, when a digital video signal is reproduced, converted to analog form, recorded by an analog recorder, subsequently reproduced and displayed as an analog video signal, errors in the displayed video signal relative to the original digital video signal may be so slight as to be practically imperceptible. However, if that analog video signal subsequently is recorded and reproduced several times, its degradation relative to the original digital video signal would be clearly pronounced and noticeable.

It has been proposed heretofore to make successive recordings of a video signal and thereby subject that signal to successive degradations in order to detect the loss of quality attributed to such recordings. For example, the video signal is reproduced, delayed, fed back to be re-recorded and then reproduced once again; and this cycle is repeated several times to permit observation of deteriorations occasioned by such rerecordings. Japanese Patent Publication 50-3111 (1975) broadly describes this technique.

A similar arrangement is described in International Patent Application WO 87/06420 (1987) in which a video tape recorder is included in a loop to record in successive tracks a single field or frame of video signals that has been cycled through the loop. An initial field or frame of test signals, supplied from an external test source, is recorded and practically simultaneously reproduced. This reproduced field or frame is converted to digital form in a timebase corrector and then re-converted to analog form for re-recording in the next track by the VTR. After a number of cycles, or generations, deterioration in the field or frame recorded in the nth track may be observed, thus permitting a user to effect manual adjustments to the VTR, the timebase corrector and/or the analog-to-digital and digital-to-analog converters. However, with this system, it is quite difficult to accurately determine the degradation to which the original field or frame has been subjected. To do so requires that the initial field or frame be reproduced and displayed and then the nth generation of that field or frame must be reproduced and displayed. This is quite time-consuming and requires the precise, rapid location of and access to the first and nth tracks on the video tape. Moreover, manual adjustments often must be made on an iterative basis requiring frequent reproduction of the first track, and this is not satisfactory. Such manual adjustments often consume several minutes, and this may be unacceptable.

In addition, to provide a reference against which an adjusted test signal is compared, the original test signal heretofore has been recorded on the video tape for several minutes. The user plays back and observes several frames of the test signal, adjusts that signal, observes the adjusted test signal and then reproduces and observes the original test signal once again to determine if additional adjustments are needed. This process is repeated several times, all during which the original test signal must be played back so that it can be observed. It is seen that this consumes several minutes of video tape recording time. And if different test signals must be processed, each such test signal must be recorded for an equal time period. However, if the duration of a pre-recorded test signal still is not adequate to effect proper adjustments, the video tape must be rewound to permit the test signal to be reproduced, observed and compared to the adjusted test signal once again, thereby adding to the difficulty in adjusting for degradation of the video signal.

OBJECTS OF THE INVENTION

Therefore, it is an object of the present invention to provide apparatus for adjusting a digital video signal reproduced from a record medium to minimize degradations and deteriorations in the video signal caused by analog processing thereof.

Another object of this invention is to provide apparatus for adjusting a digital video signal reproduced from a record medium in accordance with changes that are detected in a digital test signal that is subjected to analog processing of the type which would deteriorate the digital video signal.

A further object of this invention is to provide apparatus of the aforementioned type which is easy to use, provides accurate adjustments to the digital video signal reproduced from the record medium and avoids the drawbacks and disadvantages of the aforenoted previous proposals.

It is an additional object to provide a multi-loop test including a memory for storing a digital test signal that is reproduced from a record medium, thus minimizing the length of time that the test signal must be recorded.

A still further object of this invention is to provide apparatus of the aforementioned type in which a digital test signal is reproduced from a record medium, stored in a field memory and circulated several times through a loop which includes adjustment means for adjusting one or more characteristics of that test signal.

Yet another object of this invention is to provide apparatus for adjusting predetermined characteristics of a video signal that is subjected to analog processing after being reproduced from a record medium in which the operating mode of the apparatus may be selected as a test mode, whereby plural digital test signals are reproduced, one at a time, from a record medium, stored in a field memory and then circulated through a loop to establish settings for an adjustment circuit whereupon the next test signal is reproduced and the foregoing process is repeated.

Various other objects, advantages and features of the present invention will become readily apparent from the ensuing detailed description, and the novel features will be particularly pointed out in the appended claims.

SUMMARY OF THE INVENTION

In accordance with this invention, apparatus is provided for adjusting a digital video signal that is subjected to analog processing after being reproduced from a record medium. As a feature of this invention, a previously recorded digital test signal is reproduced and stored in a field memory from which the test signal is circulated through a loop which includes a digital-to-analog converter (DAC) and an analog-to-digital converter (ADC), and changes in the circulated digital test signal are detected. Adjustment settings for an adjustment circuit are established in response to detected changes; and the adjustment circuit operates to adjust predetermined characteristics in a digital video signal that may be reproduced from the record medium.

As one aspect of this invention, changes in the circulating test signal are used by the adjustment circuit to provide a setup adjustment. As another aspect, changes in the circulating test signal are used by the adjustment circuit to provide a video gain adjustment. And, as a further aspect, changes in the circulating test signal are used by the adjustment circuit to provide a chroma gain adjustment.

In accordance with another feature of this invention, a selector operates in a test mode to connect the field memory to the loop for an initial circulation of the reproduced test signal and then to remove the field memory from the loop for continued circulation of that test signal; while the reproduced test signal remains stored in the field memory. The selector operates in a playback mode to connect the field memory through the adjustment circuit to an output terminal, whereby a reproduced digital video signal is written into and read from the field memory, adjusted, and then supplied as an output video signal.

BRIEF DESCRIPTION OF THE DRAWINGS

The following detailed description, given by way of example and not intended to limit the present invention solely thereto, will best be understood in conjunction with the accompanying drawings in which:

FIGS. 2A-2E are timing waveform diagrams which are useful in understanding how the apparatus of FIG. 1 operates.

DETAILED DESCRIPTION OF A PREFERRED EMBODIMENT

Figure 1:
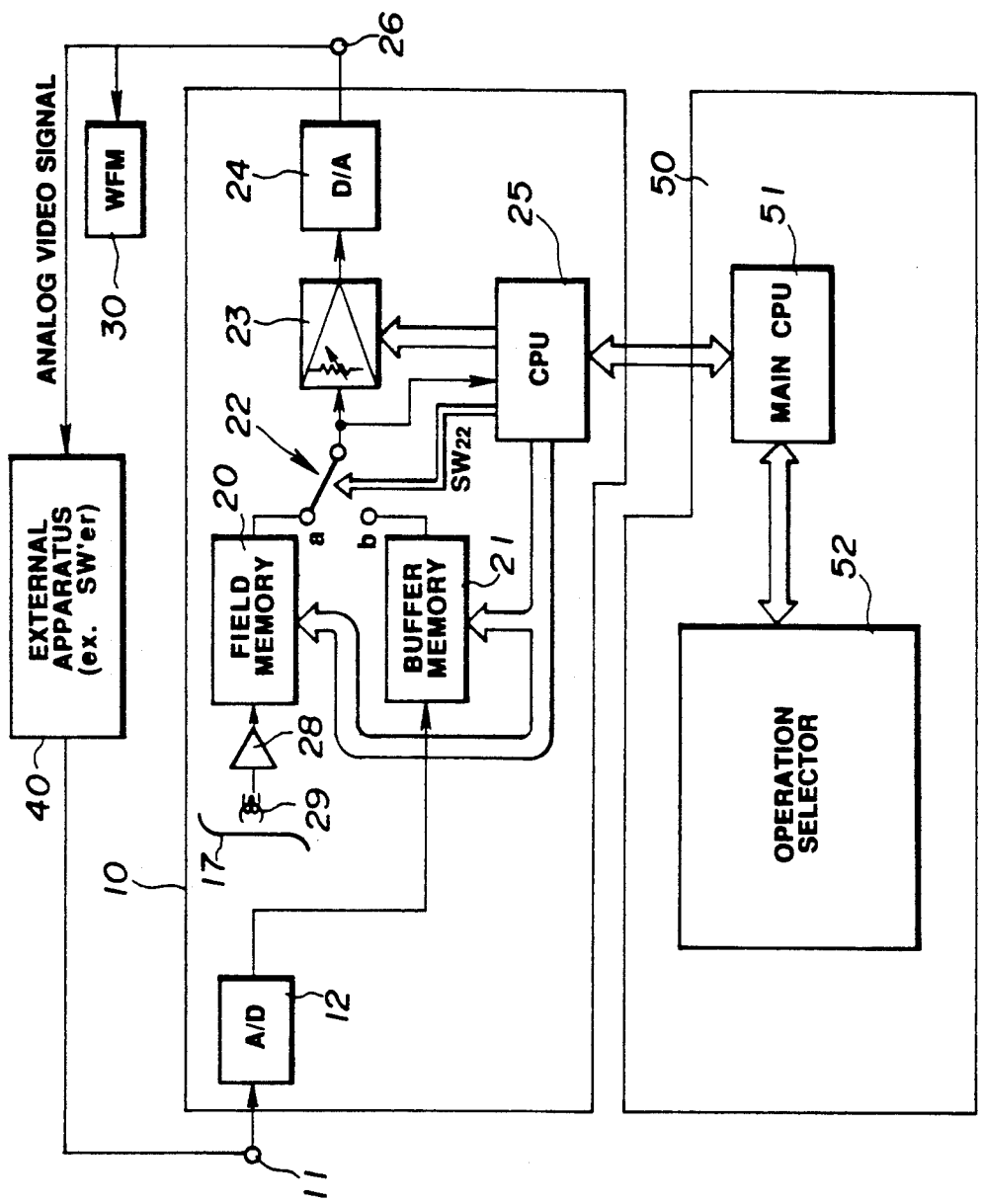
FIG. 1 is a block diagram of apparatus for adjusting a digital signal reproduced from a record medium.

Referring now to the drawings, and in particular to FIG. 1, there is illustrated a block diagram of one embodiment of apparatus in accordance with the present invention for adjusting a digital signal, preferably a digital video signal, reproduced from a record medium to compensate, or pre-correct, for degradations that otherwise would be introduced into the reproduced video signal when it subsequently is subjected to analog processing. The illustrated apparatus implements a so-called multi-loop test wherein the deterioration of various characteristics of a video signal caused by successive dubbing, or re-recording thereof is detected.

It is appreciated that little, if any, deterioration in a digital video signal is produced even when that digital video signal is subjected to multiple playback and re-recording operations, so long as the digital video signal remains in digital form. However, if the digital video signal is converted to analog form for display and/or recording on an analog recorder, a small loss of quality in the analog signal is expected. If the analog signal subsequently is reconverted to digital form and re-recorded as a digital signal, and if the foregoing digital-to-analog conversion and analog recording process is repeated, a further loss in quality of the analog signal is expected. Although each incremental deterioration may not be perceptible, if the digital video signal is subjected to multiple dubbing and multiple conversions, a degraded video picture ultimately results. The apparatus illustrated in FIG. 1 subjects a digital signal to multiple analog processing operations, whereupon the digital signal deteriorates in much the same manner as would occur if that digital signal had been converted to analog form, recorded as an analog signal, reconverted back into digital form, recorded as a digital signal, reproduced and converted into analog form once again, and so on, a multiple number of times. After M such analog processing operations, the deterioration in the digital signal may be more readily measured by detecting changes in predetermined characteristics thereof.

The multi-loop test implemented by the digital signal adjusting apparatus shown in FIG. 1 includes an analog input terminal 11, an analog-to-digital converter (ADC)

12. a digital-to-analog converter (DAC) 24, an analog output terminal 26, a feedback path for interconnecting analog output terminal 26 to analog input terminal 11 and a digital video system 10. The digital video system includes digital video recording/playback apparatus in which digital video signals are recorded on a magnetic medium 17, such as magnetic tape, by a record/playback head 29. Digital video signals which subsequently are reproduced from magnetic medium 17, converted to analog form and subjected to analog processing (such as analog recording or transmission) are subjected to deterioration; and this deterioration is aggravated if several generations of recording or transmission are effected. Digital video system 10 operates to pre-correct, or compensate the digital video signal reproduced from magnetic medium 17, prior to analog processing thereof, so as to minimize this deterioration, even if the digital video signal is subjected to several generations of analog processing.

In the illustrated embodiment, a plurality of different types of digital test signals are recorded on magnetic medium 17; and these digital test signals are reproduced, one at a time, and recirculated through the feedback path, which forms a loop, so that changes caused by such recirculation are detected. It will be appreciated, therefore, that the digital video recording/playback apparatus represented by medium 17 and head 29 is adapted to reproduce digital test signals as well as digital video signals; and deteriorations in the digital video signals are pre-corrected by the multi-loop tests performed on the reproduced digital test signals.

Preferably, several different multi-loop tests are performed, each being adapted to detect changes in a particular characteristic of the digital test signal so that such characteristic, when present in the digital video signal, is compensated. For example, changes in respective characteristics are detected for the purpose of providing a setup adjustment, a video gain adjustment, a chroma gain adjustment, a hue adjustment, and the like. The manner in which these adjustments may be made is described in copending application Ser. No. 07/865,937, filed Apr. 9, 1992, the disclosure of which is incorporated herein by reference. To this effect, different types of test signals, such as those described in the aforementioned application, are pre-recorded on magnetic medium 17, and each is adapted to be reproduced individually simply by scanning the track (or tracks) in which that particular digital test signal is recorded. As a feature of this invention, only one video frame and, preferably, only one video field of a digital test signal need be recorded. When the setup, video gain or chroma gain adjustment is performed, only the field of the particular digital test signal used for that adjustment need be reproduced. Contrary to the prior art proposals, it is not necessary to continually reproduce successive fields of the digital test signal while the multi-loop test is carried out.

Digital video system 10 includes a field memory 20, an adjustment circuit 23 and a controller (or CPU) 25. Field memory 20 is a conventional digital storage device adapted to store at least one complete field interval of a video signal. The field memory is coupled to head 29 by way of a playback amplifier 28 and is adapted to store a field interval of either the digital test signal or the digital video signal that is reproduced from magnetic medium 17. As will be described, when the illustrated apparatus operates in a test mode, a field interval of the digital test signal is reproduced from the magnetic medium and stored in field memory 20. Conversely, when the apparatus operates in a playback mode, such as a normal reproducing mode, a field interval of the prerecorded digital video signal is reproduced from magnetic medium 17 and stored in the field memory.

Adjustment circuit 23 is selectively coupled to field memory 22 by a selector switch 22. Preferably, the selector switch is a digital switch but, for convenience and to facilitate a ready understanding of the present invention, this switch is schematically illustrated as a mechanical switch having fixed contacts a and b with a movable contact selectively coupled to one or the other. Selector switch 22 also is coupled to CPU 25 which controls the operation or state of the switch. It will be appreciated that, during a playback mode, switch 22 engages its contact a to connect field memory 22 to adjustment circuit 23. However, and as will be described, in a test mode, selector switch 22 engages its contact a for a duration sufficient to supply a field interval of the digital test signal from field memory 20 to adjustment circuit 23, whereafter the selector switch is changed over to engage its contact b and thereby complete the aforementioned feedback path, thereby establishing a loop between analog output terminal 26 and analog input terminal 11.

Adjustment circuit 23 may be of the type described in the aforementioned patent application and is provided with adjustment settings to adjust the digital video signal that may be reproduced by head 29 from magnetic medium 17. These adjustment settings are established by CPU 25 during a test mode. Hence, the reproduced digital video signal is compensated by these adjustment settings for changes that are caused by analog processing.

The output of adjustment circuit 23 is coupled to analog output terminal 26 by DAC 24. During a playback mode, the analog video signals provided at analog output terminal 26 are further processed, for example, by analog transmission or analog recording; and it is intended that these video signals eventually are displayed, such as by a television receiver, monitor, or the like. Such additional analog processing and display apparatus is not illustrated in FIG. 1.

Analog output terminal 26 also is coupled to analog input terminal 11 by way of analog processing apparatus, generally indicated as apparatus 40, such as an analog switcher, for simulating the analog processing of the digital video signal that is reproduced from medium 17 when video system 10 is used in a playback mode. The feedback path from analog output terminal 26 through apparatus 40 to analog input terminal 11 is particularly used when video system 10 operates in its test mode. A display device 30, such as a waveform monitor, is coupled to the loop which interconnects terminals 26 and 11 and is used to observe changes in the circulating test signal and also is used by a technician to effect manual adjustments of adjustment circuit 23 so as to eliminate or at least minimize such changes in the circulating test signal. In one embodiment, display 30 may be a television monitor.

As mentioned above, selector switch 22 operates in a test mode to connect adjustment circuit 23 either to field memory 20 or to the loop through which the test signal circulates. Once the test signal is supplied to the loop it circulates therethrough by way of adjustment circuit 23, DAC 24, analog output terminal 26, apparatus 40, analog input terminal 11, ADC 12 and selector switch 22. To prevent this loop from undergoing oscillations as the test signal circulates therethrough, a buffer memory 21 is disposed between ADC 12 and DAC 24. Here, the buffer memory is illustrated as being coupled to ADC 12 and having an output connected to contact b of selector switch 22. The buffer memory thus delays the circulating test signal, thereby preventing regenerative oscillations in the loop.

CPU 25, which may be a conventional microprocessor suitably programmed to carry out the control operations described herein, is coupled to field memory 20, buffer memory 21, selector switch 22 and adjustment circuit 23. The CPU is adapted to control the read-/write operations of the field and buffer memories, to control the state of selector switch 22 and to establish the adjustment settings of adjustment circuit 23. In addition, the CPU is adapted to detect changes in the test signal as it circulates through the test loop; and in this regard, CPU 25 is schematically illustrated as being coupled to the output of selector switch 22 so as to receive the test signal. Thus, the CPU is supplied with the digital test signal reproduced from magnetic medium 17 and stored in field memory 20, and also with successive degradations of the circulating digital test signal, as may appear at the output of buffer memory 21. As mentioned above, the changes in particular characteristics of the digital test signal are detected in the manner described in the aforementioned patent application.

CPU 25 is coupled to a mode controller 50 which is adapted to establish a test mode or a playback mode for digital video system 10, to select the type of test signal to be reproduced from magnetic medium 17 (and, thus, the type of test to be performed) and to establish the number of times that the selected test signal is to be circulated through the loop. The mode controller includes an operation selector 52 which is provided with a number of manually operable selector switches (not shown) for selecting the type of operation to be performed, the type of test signal to be used and the number of loop circulations to be executed. For example, a test/playback mode switch may be provided as well as additional selector switches for selecting setup adjustment, video gain adjustment, chroma gain adjustment, color hue adjustment, video phase adjustment or the like. The selection of a particular type of adjustment determines the type of digital test signal to be reproduced from the magnetic medium.

Operation selector 52 is coupled to a system controller, represented herein as a main CPU 51, which may be a conventional microprocessor. The main CPU is adapted to supply control data to CPU 25 in response to the mode, adjustment type, loop circulation number or test signal selection as may be selected by operation selector 52. Stated otherwise, the main CPU functions to provide communication between CPU 25 and operation selector 52 and provides suitable indications at the operation selector to indicate when a particular test or loop circulation is completed. In addition, the operation selector may be provided with manual controls adapted to be adjusted by a user for effecting corresponding adjustments in adjustment circuit 23. Hence, by operating these controls, changes in the circulating test signal may be eliminated, or at least minimized, by the particular adjustment settings supplied to adjustment circuit 23 from operation selector 52, main CPU 51 and CPU 25.

The manner in which the multi-loop test apparatus illustrated in FIG. 1 operates now will be described.

Although not shown herein, it will be appreciated that digital video system 10 includes at least a decoder adapted to receive and decode digital video signals reproduce from magnetic medium 17. The digital video signals are recorded in conventional format, such as the D-1 or D-2 format; and the decoder used therewith operates to decode such conventional formats. It will be appreciated, therefore, that the decoder is adapted to receive digital video signals supplied from head 29 and to apply decoded digital video signals to field memory 20. The digital test signals recorded on magnetic medium 17 likewise may be compatible with the D-1 or D-2 format; and these digital test signals also may be decoded and supplied to the buffer memory by the aforementioned decoder.

Let it be assumed that a relatively small number of field intervals of a digital test signal of a particular type has been recorded on magnetic medium 17. It will be seen that only a single field interval need be recorded; and for the purpose of the present discussion, the type of test signal may be the type used for a setup adjustment, such as a test signal comprised of samples representing a video black reference level. Let it be further assumed that operation selector 52 is controlled, as by a user, to select the test mode and to select this particular type of test signal. Accordingly, main CPU 51 and CPU 25 are controlled such that when the field interval of this type of test signal is located and then reproduced by head 29, that field interval is written into field memory 20. Although not shown in FIG. 1, it will be understood that the field memory includes write-in and read-out circuits; and CPU 25 controls the write-in circuit so as to write the reproduced field of digital test signal samples into the field memory.

Let it be assumed that at a time st, the complete field interval of digital test signal has been reproduced from magnetic medium 17 and written into field memory 20. At that time, CPU 25 supplies a write inhibit signal $C_{FM}$, shown in FIG. 2B, to field memory 20. Thus, further field intervals are inhibited from being written into the field memory; and the field interval which was reproduced at time st is stored therein. This stored field interval of test signal samples is illustrated in FIG. 2A and is referred to as a stored test signal TP. Thus, the reproduced test signal samples that had been written into field memory 20 is "frozen" therein. FIG. 2C schematically represents the contents of field memory 20 from the beginning of the test mode st until the end of that mode, the latter being represented as time en. FIG. 2B illustrates the write inhibit signal $C_{FM}$ having a duration extending from the beginning of the test mode st to its end en.

The read-out circuit of the field memory is controlled, as by timing signals supplied from CPU 25, such that the stored samples of test signal TP are read out, sample-by-sample, to adjustment circuit 23 by way of selector switch 22. FIG. 2D illustrates the switch control signal $SW_{22}$ supplied to the selector switch by CPU 25. During a normal playback mode, the CPU controls the selector switch to couple the output of field memory 20 to adjustment circuit 23. However, after one field interval of the test signal stored in field memory 20 is read out therefrom, the switch control signal $SW_{22}$ changes over from, for example, its high level to a low level, thereby changing over selector switch 22 so as to couple buffer memory 21 to the adjustment circuit. From FIGS. 2D and 2E, it is seen that, while selector switch $SW_{22}$ admits of its high level, the field interval stored in field memory 20 is read out, thereby supplying the adjustment circuit with the reproduced digital test signal (or the reproduced digital video signal, as the case may be). Stated otherwise, CPU 25 controls the selector switch to change over from its contact a to its contact b one field interval following the initiation at time st of the test mode.

The digital test signal read out from the field memory and supplied to adjustment circuit 23, as represented by the cross-hatched portion in FIG. 2E, is coupled to the test loop wherein it is converted to analog form by DAC 24, subjected to simulated processing by apparatus 40 and re-converted to digital form by ADC 12. The re-converted digital signal, which thus has been subjected to degradation, is written into buffer memory 21. After a field interval of the test signal has been circulated, selector switch 22 is changed over to engage its contact b to couple buffer memory 21 to adjustment circuit 23. In this condition, the selector switch completes the circulating loop from the buffer memory through adjustment circuit 23, through DAC 24, through apparatus 40 and returning to the buffer memory by way of ADC 12. Hence, the test signal initially reproduced from magnetic medium 17 and "frozen" in field memory 20 is circulated through the test loop. Each circulation is represented in FIG. 2E as circulation 1, 2, 3, 4, ...n. It is recognized that as the digital test signal circulates, each such circulation produces deterioration therein relative to the test signal "frozen" in the field memory.

After n circulations of the test signal (wherein n is selected by suitable manual control of operation selector 52), the switch control signal $SW_{22}$ supplied to selector switch 22 by CPU 25 changes over from its low level to its high level, as shown in FIG. 2D. It will be appreciated that CPU 25 is adapted to count each circulation of the digital test signal and thus determines when n such circulations have occurred.

In one implementation of the apparatus shown in FIG. 1, adjustment circuit 23 is adapted to be manually adjusted by the user of the apparatus. Typically, such manual adjustments are made by operating suitable control elements provided in operation selector 52. Since the change in the digital test signal resulting from one circulation of the loop is relatively small, as mentioned above, it normally is expected that such change may not be easily perceived by the user to effect compensation therefor. However, after n such circulations the degradation or deterioration in the digital test signal is more easily observed. Waveform monitor 30 displays the digital test signal (converted to analog form by DAC 24) at each circulation; and the visible change after n circulations will be sufficiently noticeable such that the user may operate operation selector 52 in a manner which provides adjustment settings for adjustment circuit 23 to eliminate or at least minimize such changes.

This correction of the digital test signal may be observed on waveform monitor 30 as the user operates the adjustment control elements of operation selector 52. For example, if digital video system 10 is operating in a setup adjustment test mode, the digital test signal reproduced from magnetic medium 17, stored in field memory 20 and circulated through the test loop represents a video black level; and changes in this video black level caused by the simulated analog processing of the test loop are displayed on waveform monitor 30, thus enabling the user to establish adjustment settings for adjustment circuit 23 to minimize such black level changes. As another example, if the digital video system operates in its video gain adjustment test mode, the digital test signal reproduced from the magnetic medium, stored in the field memory and circulated through the test loop represents a gray level; and, here too, waveform monitor 30 displays changes in the gray level caused by the simulated analog processing for each circulation, and such changes may be minimized by manual adjustment of the control elements provided in operation selector 52. As a further example, if digital video system 10 operates in its chroma gain adjustment test mode, the digital test signal reproduced from magnetic medium 17, stored in field memory 20 and circulated through the test loop represents the chrominance burst signal (and may correspond to a single frequency test signal); and as before, changes in this test signal caused by analog processing at each circulation are observed on waveform monitor 30 and may be corrected by operating operation selector 52.

While the foregoing has described a manual adjustment of adjustment circuit 23, the adjustment settings therefor may be generated automatically by CPU 25 in the manner described in the aforementioned copending application. In this automatic implementation as well as in the manual adjustment implementation, CPU 25 includes a detector for detecting changes in the circulating test signal. Whereas these detected changes are used in the automatic adjustment implementation to supply adjustment settings automatically to adjustment circuit 23, these detected changes may be used in the manual adjustment implementation for display purposes. It will be recognized that, by displaying the detected changes, either directly or by enhancing the display provided by waveform monitor 30, the test signal may be compensated; and such compensation provides pre-correction adjustment of the digital video signal subsequently reproduced by head 29.

Returning to FIGS. 2D and 2E, it will be seen that, when n circulations of the digital test signal have been counted by CPU 25, switch control signal $SW_{22}$ changes over from its low level to its high level, thereby controlling selector switch 22 to couple the test signal "frozen" in field memory 20 to the test loop once again. This permits a comparison of the original "frozen" test signal to the adjusted test signal every n circulations. If further adjustments to adjustment circuit 23 are needed, the foregoing operation may be repeated for every n circulations of the test signal. It will be appreciated, therefore, that adjustment settings may be supplied to the adjustment circuit after the test signal has circulated through the test loop n times or, alternatively, such adjustment settings may be supplied after each circulation. It is expected, however, that in the manual adjustment implementation of the present invention, these adjustment settings will be made once every n circulations because the rate at which the test signal circulates may be too fast to enable the user to effect a manual adjustment after each individual circulation.

Upon the occurrence of time en, which may be selected by user operation of operation selector 52, the test mode is terminated. CPU 25 changes over the switch control signal $SW_{22}$ from its low level to its high level, as shown in FIG. 2D, thus connecting field memory 20 to analog output terminal 26 by way of adjustment circuit 23 and DAC 24. The circulating loop thus is opened. In addition, the write inhibit signal $C_{FM}$ supplied to field memory 20 by CPU 25 terminates, as shown in FIG. 2B, thus permitting successive fields of digital signals reproduced from magnetic medium 17 to be written into the field memory. Accordingly, digital video system 10 now may operate in its playback mode to reproduce digital video signals that are written into and subsequently read from field memory 20, pre-corrected by adjustment circuit 23, converted to analog form by DAC 24 and supplied to other apparatus (not shown) connected to analog output terminal 26. Notwithstanding the analog processing to which this reproduced digital video signal is subjected, the pre-correction or compensation thereof by adjustment circuit 23 (whose adjustment settings have been made in the manner described above) avoids or at least minimizes deterioration and degradation in the video signal.

If, after completing the test mode described above, another adjustment test operation is to be effected, the next digital test signal that may be recorded on magnetic medium 17 is reproduced therefrom and written into field memory 20. Digital video system 10 then uses this test signal, which is "frozen" in field memory 20 in the manner discussed above, to carry out another test operation.

It is appreciated that, in accordance with the present invention, it is not necessary to record several fields or frames of test signals on the magnetic medium. Rather, only a single field of each type of test signal need be recorded; and when a test operation is effected, a desired one of those test signals is reproduced and written into field memory 20 from which it is supplied to and circulated through the illustrated test loop. If successive tests are to be executed, such as a setup adjustment, a video gain adjustment, a chroma gain adjustment, a color hue adjustment, or the like, test signals that are used for each such adjustment may be recorded successively on the magnetic medium, and each may be reproduced, one-at-a-time, to perform a corresponding test. After one test is completed and suitable adjustment settings have been supplied to adjustment circuit 23, the next pre-recorded test signal is reproduced and the test associated therewith is performed. Therefore, even if several minutes are needed to carry out the various tests to effect the aforementioned setup, video gain, chroma gain and color hue adjustments (as well as other adjustments that may be desired), only a single field of each type of test signal need be recorded on the magnetic medium. Contrary to previous proposals, it is not necessary to record several minutes of test signals on the medium, nor is it necessary to rewind the medium and reproduce a test signal therefrom in the event that the length of time needed to carry out the test exceeds the time duration of the recorded test signal.

While the present invention has been particularly shown and described with reference to a preferred embodiment, it will be readily appreciated by those of ordinary skill in the art that various changes and modifications may be made without departing from the spirit and scope of the invention. For example, the magnetic medium 17 may be a magnetic tape or a magnetic disk. Other record media may be used as well, such as optical disks or other conventional media known to record digital signals. In addition, although not shown herein, it should be appreciated that digital video system 10 may be used for both recording and reproducing digital signals on medium 17. When used for recording, digital video signals may be encoded in a conventional recording format, such as the D-1 or D-2 formats known to those of ordinary skill in the art. In this regard, suitable encoding and recording circuitry is coupled to head 29, although such circuitry is not shown in FIG. 1 and a discussion thereof is not needed for a full understanding of the present invention.

Still further, a jog dial or playback switch may be provided, such as on operation selector 52, to enable a user to locate a desired portion of medium 17 from which digital signals may be reproduced. It will be understood that a conventional jog dial or playback switch facilitates the location of a desired pre-recorded test signal for reproduction from medium 17.

As a further alternative, digital video system 10 may be used in connection with an external analog video recorder/reproducer. In that event, the analog signal reproduced by that external device is coupled to analog input terminal 11 for conversion to a digital signal which then is written into field memory 20 in which it is "frozen" in much the same manner as the digital signal that is reproduced from medium 17.

It is intended that the appended claims be interpreted so as to cover the specific embodiment described herein, those changes and modifications that have been suggested above and all equivalents thereto.

What is claimed is:

1. Apparatus for adjusting a digital video signal which is subjected to analog processing after being reproduced from a record medium, wherein adjustment settings to adjust the digital video signal are made in response to changes in reproduced test signals which had been previously recorded, said apparatus comprising:

field memory means for receiving digital video or test signals selectively reproduced from the record medium and writing at least one field of the reproduced signals therein for storage;

loop means including analog conversion means and analog processing circuits for converting a reproduced test signal to analog form and recirculating the test signal through said loop means;

control means for supplying the stored signals in said field memory means as input signals to said loop means and for concurrently inhibiting said field memory means from writing further signals therein; and detecting means coupled to said loop means for detecting changes in the test signal as said test signal circulates through said loop means.

2. Apparatus for adjusting a digital video signal which is subjected to analog processing after being reproduced from a record medium, wherein adjustment settings to adjust the digital video signal are made in response to changes in reproduced test signals which had been previously recorded, said apparatus comprising:

field memory means for receiving reproduced digital video and test signals and writing at least one field of the reproduced signals therein for storage;

adjustment means coupled to receive a reproduced signal for adjusting predetermined characteristics in the received signal in accordance with adjustment settings;

loop means including analog conversion means and analog processing circuits for converting a reproduced test signal to analog form and recirculating the test signal;

control means for supplying the stored signals in said field memory means as input signals to said loop means and for concurrently inhibiting said field memory means from writing further signals therein; and detecting means coupled to said loop means for detecting changes in the circulating test signal.

3. The apparatus of claim 2 wherein said adjustment means is coupled to said field memory means for receiving and adjusting the reproduced signal stored therein.

4. The apparatus of claim 3 further including selector means for selectively connecting said adjustment means into said loop means for adjusting either the reproduced digital video signal or the recirculating test signal.

5. The apparatus of claim 2 wherein said test signal exhibits at least one of said predetermined characteristics and said detecting means detects changes in said one predetermined characteristic after said test signal has circulated a predetermined number of times.

6. The apparatus of claim 5 wherein said one predetermined characteristic is a setup adjustment characteristic.

7. The apparatus of claim 5 wherein said one predetermined characteristic is a video gain adjustment characteristic.

8. The apparatus of claim 5 wherein said one predetermined characteristic is a chroma gain adjustment characteristic.

9. The apparatus of claim 2 wherein the previously recorded test signal exhibits plural characteristics, respective ones of which being recorded successively; and said field memory means writes said test signal having a respective characteristic thereinto, one at a time, whereby the test signal stored in said field memory means and having said respective characteristic is supplied to said loop means and changes in said respective characteristic are detected by said detecting means.

10. The apparatus of claim 3 wherein said control means is operable in a test mode to supply a field of test signals reproduced from a record medium and stored in said field memory means to said loop means while inhibiting further signals from being written into said field memory means, and operable in a reproducing mode to supply successive fields of digital video signals reproduced from a record medium and stored in said field memory means to said adjustment means.

11. The apparatus of claim 10 wherein said loop means further includes delay means connectable therein for delaying the circulating test signal to prevent said loop means from oscillating.

12. The apparatus of claim 11 further including selector means operable in a test mode to couple said field memory means to said loop means to supply said reproduced test signal thereto, and then to disconnect said field memory means from said loop means to circulate said test signal.

13. The apparatus of claim 12 wherein the analog conversion means included in said loop means comprises digital-to-analog converting (DAC) means coupled to said adjustment means for converting the adjusted signal provided by said adjustment means to analog form, an analog output terminal coupled to said DAC means, and analog-to-digital converting (ADC) means coupled to said analog output terminal to receive an analog signal therefrom, to convert the analog signal to digital form and to couple the converted analog signal to said delay means for recirculation.

14. The apparatus of claim 13 wherein said selector means operates in the test mode to couple said delay means into said loop means when said field memory means is disconnected from said loop means.

15. The apparatus of claim 14 wherein said selector means operates in a reproducing mode to establish a signal path for reproduced digital video signals to said field memory means, to said adjustment means, to said DAC means to said analog output terminal.

16. Apparatus for reproducing a digital video signal that is subjected to analog processing and for determining changes in said digital video signal caused by said analog processing, said apparatus comprising:

playback means for playing back digital video signals or digital test signals previously recorded on a record medium;

field memory means coupled to said playback means for writing reproduced digital signals therein for storage of at least one field interval thereof;

output means selectively connectable to said field memory means for providing output video signals derived from played back digital video or digital test signals read out from said field memory means;

loop means selectively coupled to said output means for circulating a played back digital test signal, whereby the digital test signal is subjected to changes as it circulates through said loop means;

control means operable in a playback mode for connecting an output of said field memory means to said output means for supplying output video signals derived from played back digital video signals, and operable in a test mode for writing a field interval of reproduced digital test signals into said field memory means and then inhibiting further digital test signals from being written therein and for coupling said loop means to said output means to circulate said digital test signals after said field interval of digital test signals is read out from said field memory means; and detecting means coupled to said loop means to detect changes in the digital test signals as said digital test signals circulate through said loop means.

17. The apparatus of claim 16 wherein said output means includes digital-to-analog converting (DAC) means for converting digital video or digital test signals to analog form.

18. The apparatus of claim 17 wherein said loop means includes analog-to-digital converting (ADC) means having an input coupled to said output means and an output selectively coupled to said DAC means.

19. Apparatus for reproducing a digital video signal that is subjected to analog processing and for determining changes in said digital video signal caused by said analog processing, said apparatus comprising:

playback means for playing back digital video signals or digital test signals previously recorded on a record medium;

field memory means coupled to said playback means for writing reproduced digital signals therein for storage of at least one field interval thereof;

output means selectively connectable to said field memory means for providing output video signals derived from played back digital video or digital test signals read out from said field memory means;

loop means selectively coupled to said output means for circulating a played back digital test signal, whereby the circulated digital test signal is subjected to changes;

control means operable in a playback mode for connecting an output of said field memory means to said output means for supplying output video signals derived form played back digital video signals, and operable in a test mode for writing a field interval of reproduced digital test signals into said field memory means and then inhibiting further digital test signals from being written therein and for coupling said loop means to said output means to circulate said digital test signals after said field interval of digital test signals is read out from said field memory means, said control means including selector switch means operable in said playback mode to couple said field memory means to said output means and operable in said test mode to couple said field memory means to said output means for a time interval sufficient to supply to the output means said field interval of digital test signals read out from said field memory means and thereafter to couple the loop means to said output means; and detecting means coupled to said loop means to detect changes in the circulating digital test signals.

20. The apparatus of claim 19 wherein said control means further includes means for sensing when the digital test signals circulate through said loop means a predetermined number of times to actuate said detecting means.

* * * * *